(12) United States Patent
Delia et al.

(10) Patent No.: US 8,528,365 B2
(45) Date of Patent: Sep. 10, 2013

(54) APPARATUS FOR REMOVING VOLATILIZED MATERIALS FROM AN ENCLOSED SPACE IN A GLASS MAKING PROCESS

(75) Inventors: Robert Delia, Horseheads, NY (US); Ahdi El Kahlout, Lexington, KY (US); Anca D. Fountain, Pleasant Gap, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/034,094

(22) Filed: Feb. 24, 2011

(65) Prior Publication Data

US 2012/0216575 A1 Aug. 30, 2012

(51) Int. Cl.
*C03B 32/00* (2006.01)
*C03B 17/06* (2006.01)

(52) U.S. Cl.
USPC .................................. 65/157; 65/204; 65/186

(58) Field of Classification Search
USPC ............. 65/90–101, 193, 204, 253, 258, 356, 65/157
See application file for complete search history.

(56) References Cited

U.S. PATENT DOCUMENTS

| | | | | |
|---|---|---|---|---|
| 1,941,807 A * | 1/1934 | Machlet | ........................... | 65/120 |
| 1,953,341 A * | 4/1934 | Drake | ............................... | 65/83 |
| 2,313,495 A * | 3/1943 | Tanberg | ........................... | 65/204 |
| 2,659,452 A * | 11/1953 | Gaydasch | ...................... | 62/55.5 |
| 2,708,813 A * | 5/1955 | Bourgeaux | ...................... | 65/438 |
| 3,356,476 A * | 12/1967 | Gulotta | ............................. | 65/27 |
| 3,595,635 A * | 7/1971 | Nixon | ............................. | 65/157 |
| 3,597,178 A * | 8/1971 | Tilton | ............................... | 65/27 |
| 3,615,316 A * | 10/1971 | Kita | ................................... | 65/27 |
| 3,630,701 A * | 12/1971 | Javaux et al. | ..................... | 65/27 |
| 3,682,609 A * | 8/1972 | Dockerty | ......................... | 65/83 |
| 3,740,208 A * | 6/1973 | Takahashi et al. | ................ | 65/90 |
| 3,798,016 A * | 3/1974 | Ormesher et al. | ............. | 65/99.4 |
| 4,236,906 A | 12/1980 | Hummel | ........................... | 65/27 |
| 4,322,235 A * | 3/1982 | Schwenninger | ............. | 65/182.3 |
| 4,340,412 A | 7/1982 | May | ............................... | 65/182.5 |
| 4,360,373 A * | 11/1982 | Pecoraro | ........................ | 65/99.2 |
| 4,440,559 A * | 4/1984 | Shaw, Jr. | ......................... | 65/99.5 |
| 4,769,925 A | 9/1988 | Matsubara | ...................... | 34/243 |
| 5,059,232 A * | 10/1991 | Kurashina et al. | ............. | 65/99.2 |
| 5,659,564 A * | 8/1997 | Elliott | ............................. | 373/27 |
| 6,094,942 A * | 8/2000 | Falleroni et al. | ................ | 65/99.2 |
| 6,294,005 B1 * | 9/2001 | Inoue et al. | ...................... | 96/193 |
| 6,502,423 B1 * | 1/2003 | Ostendarp et al. | ........... | 65/29.14 |
| 7,207,193 B2 * | 4/2007 | Xun et al. | ......................... | 65/95 |
| 7,984,625 B2 * | 7/2011 | Markham et al. | ............ | 65/29.12 |
| 8,037,716 B2 * | 10/2011 | Aniolek et al. | .................... | 65/95 |

(Continued)

FOREIGN PATENT DOCUMENTS

JP 05124827 A * 5/1993
JP 10053425 A * 2/1998

(Continued)

*Primary Examiner* — Jodi C Franklin
(74) *Attorney, Agent, or Firm* — Kevin M. Able

(57) ABSTRACT

An apparatus and method for removing volatilized chemical compounds from within enclosed or partially enclosed spaces containing molten glass. One or more condensing devices are positioned within the enclosure to produce preferential condensation of the vapor on condensing elements of the condensing devices, thereby facilitating easy removal of the condensates from the enclosure. The condensing elements may have a variety of shapes and sizes depending on the design of the enclosure.

11 Claims, 5 Drawing Sheets

(56) References Cited

U.S. PATENT DOCUMENTS

| | | | |
|---|---|---|---|
| 8,141,388 B2* | 3/2012 | Burdette | 65/90 |
| 8,176,753 B2* | 5/2012 | Kahlout et al. | 65/90 |
| 8,210,001 B2* | 7/2012 | Allan et al. | 65/53 |
| 2003/0121287 A1* | 7/2003 | Chalk et al. | 65/90 |
| 2004/0065115 A1* | 4/2004 | Mueller et al. | 65/29.17 |
| 2005/0016214 A1* | 1/2005 | Hsu et al. | 65/33.9 |
| 2006/0242995 A1* | 11/2006 | Bookbinder et al. | 65/134.1 |
| 2007/0068197 A1* | 3/2007 | Pitbladdo | 65/90 |
| 2008/0041109 A1* | 2/2008 | Burdette et al. | 65/135.2 |
| 2008/0184741 A1* | 8/2008 | Mueller et al. | 65/29.14 |
| 2009/0100873 A1* | 4/2009 | Allan et al. | 65/85 |
| 2009/0217705 A1* | 9/2009 | Filippov et al. | 65/99.1 |
| 2009/0217708 A1* | 9/2009 | DeAngelis et al. | 65/134.2 |
| 2010/0031702 A1* | 2/2010 | Tomamoto et al. | 65/91 |
| 2010/0122556 A1* | 5/2010 | Kin et al. | 65/90 |
| 2010/0162763 A1* | 7/2010 | Pitbladdo | 65/90 |
| 2010/0199721 A1* | 8/2010 | Antoine et al. | 65/134.9 |
| 2010/0212360 A1* | 8/2010 | Delia et al. | 65/90 |
| 2011/0126591 A1* | 6/2011 | Chalk et al. | 65/84 |
| 2011/0126592 A1* | 6/2011 | De Angelis et al. | 65/90 |

FOREIGN PATENT DOCUMENTS

| | | | |
|---|---|---|---|
| JP | 10053426 A | * | 2/1998 |
| JP | 10291826 A | * | 11/1998 |
| JP | 2001031434 A | * | 2/2001 |

* cited by examiner

APPARATUS FOR REMOVING VOLATILIZED MATERIALS FROM AN ENCLOSED SPACE IN A GLASS MAKING PROCESS

BACKGROUND OF THE INVENTION

1. Field of the Invention

This invention relates to a method and an apparatus for removing volatilized materials from an enclosed space, and in particular, preventing the condensation of volatilized materials on selected surfaces within the space in a glass making process.

2. Technical Background

In a typical glass manufacturing system, various raw constituents or batch materials, generally in a pulverulent state, are introduced or "charged" into a melting furnace. The pulverulent batch materials are melted to form a viscous molten material that can be flowed to a fabrication portion of the system. The viscous molten material, when cooled, forms a glass, and may be produced in a variety of shapes. For the purposes of discussion and not limitation, the viscous molten material will hereinafter be referred to as molten glass or glass melt.

The manufacture of glass articles such as glass sheets by melting raw materials in a furnace is known. In one such process, known as a down-draw or fusion process, molten glass overflows the sides of a trough in a forming body. The separate flows then re-unite, or fuse, at the bottom of the forming body to form a continuous ribbon of glass. Separate sheets of glass are then cut from the ribbon. At least a portion of the forming apparatus is housed within a space that is at least partially enclosed by walls.

Unfortunately, volatilized materials are generated by or from the molten glass, and these volatilized materials tend to condense on surfaces within the confines of the forming space, most notably on the inside surfaces of the enclosure walls or the surfaces of equipment contained within the enclosure used to draw the glass ribbon. Condensed materials can accumulate on equipment surfaces and interfere with the thermal properties of the surface, or break off and contaminate the glass ribbon or interfere with the thermal characteristics of the process.

The present disclosure describes methods and apparatus for mitigating these effects.

SUMMARY

The manufacture of glass from a molten material generally results in the formation of volatilized chemical compounds. In some processes, such as the float process for manufacturing glass sheet material, manufacturers must contend with volatilization of the tin bath on which the glass material floats. This volatilized tin can condense on the roof of the chamber housing the glass and tin, whereupon the condensate may drip from the roof onto the horizontally disposed glass causing defects in the glass.

In a fusion forming method of producing sheet glass, a molten glass material is fed into a forming body in the general shape of a wedge having an open channel formed in the upper surface thereof. The molten glass material overflows the upper portions of the channel, flows down the outside forming surfaces of the forming body as separate streams. The separate streams join at the bottom, or root, of the forming body to produce a ribbon of glass having exceptional surface quality. Since the only surfaces of the molten glass material to contact the forming surfaces of the forming body are confined within an interior of the glass ribbon drawn from the root of the forming body, the outside surfaces of the ribbon are pristine. Every effort is made to maintain the pristine nature of the ribbon surfaces by avoiding contact with the principal surfaces of the ribbon. Indeed, the only contact with the ribbon is via edge portions of the ribbon, at least until the ribbon is solidified into glass.

The manufacture of glass occurs at relatively high temperature, the temperature depending on the nature of the glass material. For example, in the manufacture of thin sheets of glass, such as glass used in producing display devices, the molten glass material in some instances may reach a temperature of 1500 C or greater. Even during the forming process, the molten glass material may be 1000° C. or more. The high temperature experienced by the molten glass material can cause certain constituents of the glass material to become volatilized into a vapor that fills the space surrounding the molten glass material. If the molten glass material is within a confined space, the volatilized constituent(s) may condense on nearby surfaces and when a sufficient amount of material has condensed, release from the surface. For example, if the volatilized material condenses as a liquid phase, the condensate can drip downward and collect on other surfaces or devices, such as the rollers used to draw and guide the ribbon. If the volatilized material condenses as a solid, the solid condensate can collect and interfere with the heat thermal balance of the ribbon forming process.

In accordance with one embodiment, an apparatus for forming a glass sheet is disclosed comprising an enclosure comprising a molten glass positioned therein, the enclosure further comprising an atmosphere comprising volatilized inorganic materials, a condensing device comprising a condensing element extending into the atmosphere. The condensing device comprises a passage for receiving a cooling fluid that is flowed into the condensing element. The condenser element comprises at least one elongate condensing member. The at least one elongate condensing member comprises longitudinal axis. The longitudinal axis of the condensing member may be curved. For example, the at least one elongate condensing member may be in the form of an arc or a coil. In some embodiments the condensing device may comprise a plurality of elongate condensing members.

In certain embodiments the apparatus comprises a forming body from which a ribbon of glass is drawn, the forming body comprising converging forming surfaces that join at a bottom root of the forming body. The apparatus further comprising a plurality of condensing elements wherein at least one condensing element is positioned on a first side of an imaginary vertical plane passing through the root and another condensing element is positioned on a second side of the vertical plane.

In some embodiments the apparatus comprises a forming body from which a ribbon of glass is drawn, the forming body comprising converging forming surfaces that join at a bottom root of the forming body, and wherein a distance between the condensing element and a distance between a distal end of the condensing element and an edge of the ribbon is at least 5 cm.

In some embodiments the apparatus comprises a forming body from which a ribbon of glass is drawn wherein a distance between a distal end of the condensing element and an edge of the ribbon is at least 5 cm.

In some embodiments the apparatus comprises a forming body comprising converging forming surfaces that meet at a bottom root of the forming body, and wherein for a first imaginary vertical plane parallel with and extending through the root and intersected by a second imaginary vertical plane perpendicular to the root and intersecting an outermost edge of the ribbon, the condensing element extending into the enclosure does not extend from the enclosure past the second vertical plane.

In accordance with certain embodiments a temperature of the condensing element is at least 50° C. less than a temperature of the enclosure proximate the condensing element. An outside surface area of the condensing element is preferably at least 100 cm$^2$, and in some instances outside surface area of the condensing element is at least 480 cm$^2$. The condensing element may extend at least 10 cm from an inside surface of the enclosure.

According to still another embodiment a method is disclosed comprising providing a glass making apparatus comprising an enclosure and a forming body from which glass is drawn positioned within the enclosure, wherein the apparatus further comprises a condensing element extending from an inside surface of the enclosure into a volume enclosed by the enclosure, the volume including a volatilized chemical compound in an atmosphere contained in the volume and flowing a cooling fluid through the condensing element such that the volatilized chemical compound condenses on the condensing element. In certain embodiment, the chemical compound condenses as a liquid phase. For example, the liquid condensation may drip from the condensing element and collect from a collection vessel, such as a drip tray. The drip tray may be periodically removed and replaced, or emptied, cleaned and reinstalled.

In other embodiments, the volatilized chemical compound condenses on the condensing element as a solid. The condensing element, or the entire condensing device, may be removed and cleaned or replaced.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

DETAILED DESCRIPTION

Figure 1:
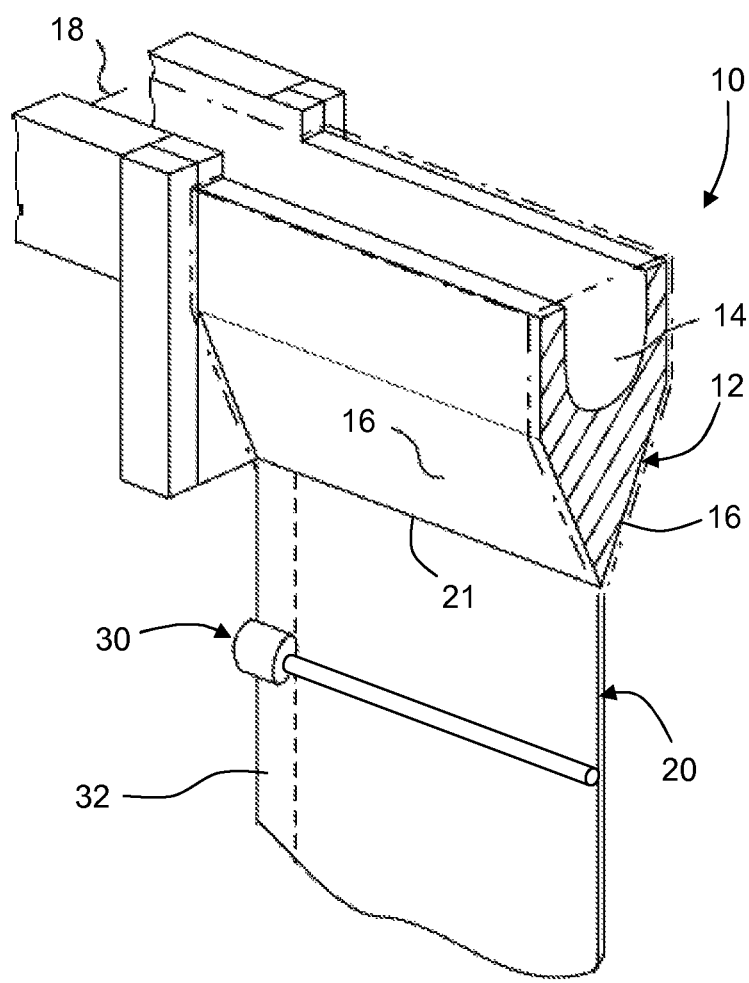
FIG. 1 is a perspective and partial cross sectional side view of an exemplary fusion glass making apparatus according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

While the following description is presented in the context of forming a sheet of glass is a fusion glass making process, the principals described herein are applicable to a broad range of activities where a molten glass is contained within a closed or partially closed space and condensation of volatilized materials is undesirable. The principals disclosed herein are therefore not limited by the following specific embodiments, and may be used, for example, in other glass making processes, such as float, up-draw and slot-style processes.

Shown in FIG. 1 is a cross sectional view of an example fusion glass forming apparatus 10 or fusion draw machine (FDM) comprising forming body 12. Forming body 12 is an open top vessel comprising a trough 14 and converging sidewalls 16 such that molten glass 18 entering forming body 12 overflows the trough and runs down the converging sidewalls as two separate flows of molten glass. The two separate molten glass flows rejoin where the converging sidewalls meet to form glass ribbon 20 having a pristine outer surface. The line along which the converging forming surfaces meet is known as the root 22. Glass ribbon 20 is pulled downward from the forming body root and may then be cut into sheets of predetermined size after the ribbon has cooled to a satisfactory viscosity and temperature. A more thorough description of a fusion glass making process can be found in U.S. Pat. No. 3,338,696 to Dockerty, the content of which is incorporated herein by reference.

Figure 2:
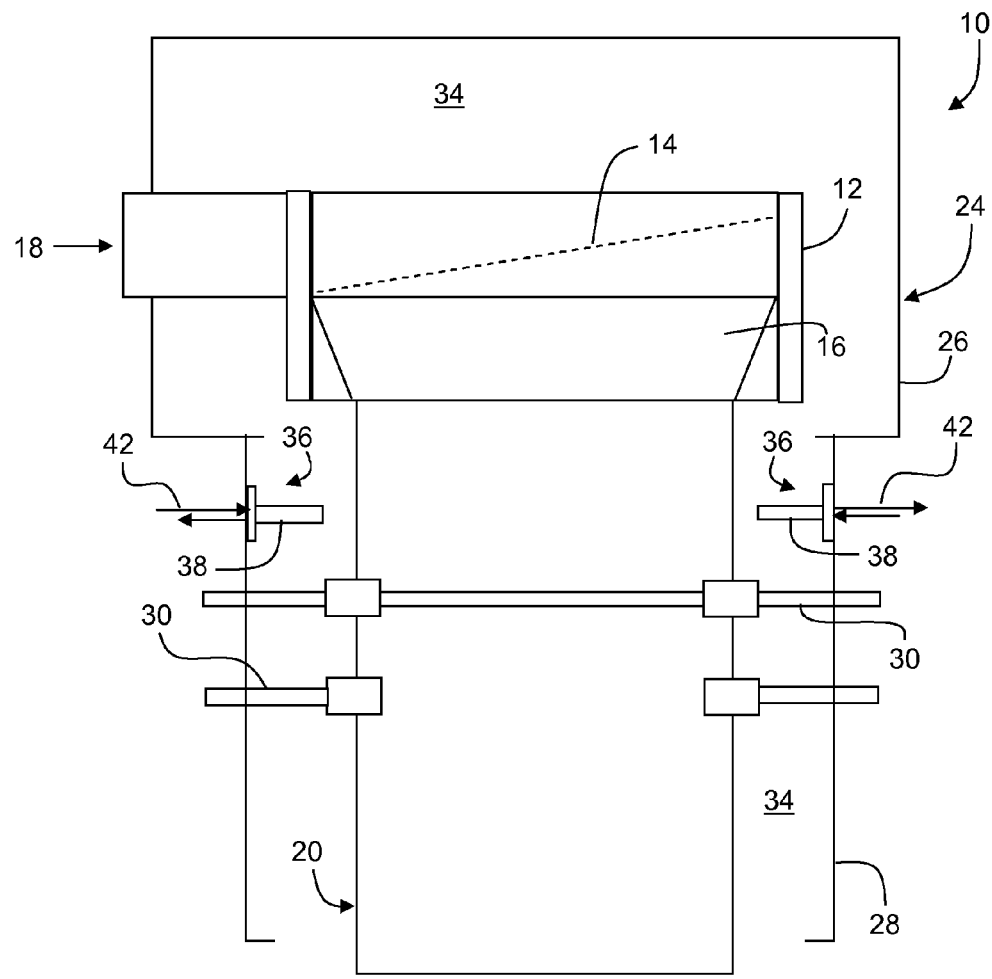
FIG. 2 is a side view of the apparatus of FIG. 1.

To control the environment surrounding the glass during the ribbon forming process, forming apparatus 10 typically also includes an enclosure 24 shown in FIG. 2 that surrounds the forming body and portions of the newly formed ribbon. Enclosure 24 may, for example, comprise an upper enclosure portion 26 and one or more lower enclosure portions 28 that provide a stable thermal environment as the molten glass transitions from a liquid to an elastic solid, and protects the newly formed ribbon from particulate contamination. Enclosure 24 also provides a convenient platform for attaching additional process equipment, such as roll assemblies 30 for pulling and managing the shape and position of the ribbon by gripping edge portions 32 of the ribbon. Nevertheless, in spite of its protective functions, enclosure 24, and other attached equipment, can itself serve as a source of contamination to the glass ribbon flowing from the forming body.

During the melting process raw materials, including certain metallic oxide materials comprising the "batch" and selected to manufacture a predetermined glass composition, are fed into a melting furnace by a feeding apparatus such as a screw type feeder or auger. Additional materials may also be included, such as various doping materials, to achieve desired properties of the glass article formed by the process. In some cases, particularly in the manufacture of glass sheets for the display industry, the melting temperature of the glass can be quite high, in excess of 1200° C., 1300° C., 1400° C. and even 1500° C. A post-melting refining (fining) operation (not shown) is designed to heat the molten glass to even higher temperatures to remove gaseous inclusions from the resultant molten material (melt), but the high temperature of the melt can continue to volatilize certain constituents of the molten glass mixture, or even portions of the equipment and/or vessels in contact with the melt further downstream in the process. Common volatilized constitutes may include zirconia and boron oxide. Boron is a particularly troublesome constituent because of its low vapor pressure.

Condensation of volatilized materials can plague the manufacturing process throughout the period in which glass material is molten, but are most damaging during the forming process, when significant monetary value has been imparted to the glass. During the fusion forming process molten glass 18 enters forming body 12 and is exposed to an atmosphere 34 contained within protective enclosure 24 and surrounding the forming body. However, when the molten glass enters forming body 12 the exposure of a free surface to atmosphere 34 provides an opportunity for low vapor pressure glass constituents to volatilize into the enclosure atmosphere. These volatilized materials may then condense on surfaces within the enclosure that are at a temperature lower than the molten glass. Condensation occurs preferentially on the coldest surfaces. For example, the enclosure walls, the pulling rolls used to draw the glass downward from the forming body, and virtually any other cool body relative to the vapor within the enclosure can accumulate condensed material. The condensate deposit and build-up increases over time on certain internal FDM surfaces and can change the heat transfer characteristics of the FDM. More importantly, condensate in liquid form may begin to flow into gobs on the FDM surfaces once a sufficient build-up has been created. These gobs can interfere with the glass ribbon and damage or limit the functionality of internal FDM components, like rollers that contact and guide the glass ribbon for instance.

In accordance with embodiments described herein, a condensing device 36 comprising at least one condensing element 38 formed as a coil, tube, rod or other suitable shape and made of a high temperature resistant material such as stainless steel, is deployed within enclosure 24, in either upper enclosure portion 26, or in particular within lower enclosure portion 28. A condensing device is inserted into the fusion draw machine atmosphere and can be connected to a cooling fluid supply line to provide the cooling necessary for the condensation to occur. Water is one preferred cooling fluid due to its high heat capacity, lo cost and easy availability. However, in some embodiments air may be used as a suitable cooling fluid. The condensing device can be mounted to the FDM with the aid of a support plate 40 and may be inserted through existing openings or newly formed access points through enclosure 24.

Condensing devices can be designed to not interfere with current FDM capability to manage the thermal profile of the glass by balancing the heat transfer characteristics of the condensing element. This can be done, for example, by selecting an appropriate cooling fluid temperature and flow rate, size and shape of the condensing element, and the general location of the condensing device relative to the glass ribbon. Different shapes and patterns of condensing element designs, for example, can be used to maximize condensate removal at different locations in the FDM. The overall design and placement of the condensing device and condensing element depends on the specific construction and design of the FDM. Condensing elements can be made of a single tube formed to a given shape, with no welds to avoid the potential for cracks or leaks. Such a no-weld feature reduces the risk of coolant leakage. Such leakage is highly undesirable, particularly when a liquid coolant is used due to the presence of electrical circuitry and wiring in the same area and potential impact on the thermal environment with the enclosure and its impact on the forming of the glass ribbon. However, even a gas leak, such as a leakage of air, can disrupt and unbalance the thermal environment within the enclosure, thereby impacting ribbon formation.

Due to the high temperature capability of the condensing element material, the condensing device may not require a continuous flow of fluid through the condensing element for equipment strength or integrity. Eliminating the need for a continuous connection to cooling equipment provides for ease of installation, robustness, and prevents manufacturing issues in the event that fluid flow is interrupted.

Figure 3:
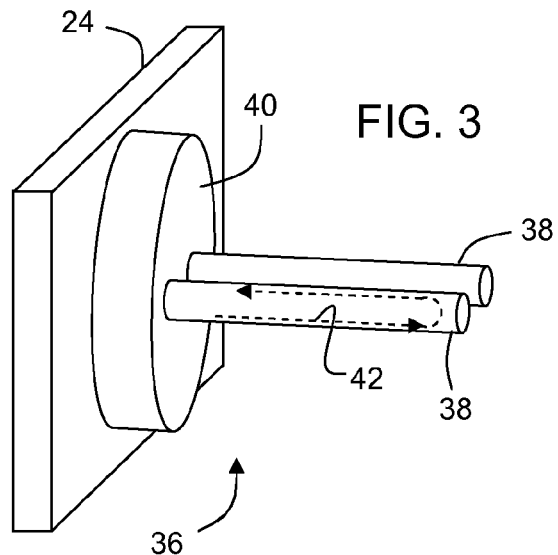
FIG. 3 is perspective view of a condensing device according to an embodiment of the present invention.
Figure 4:
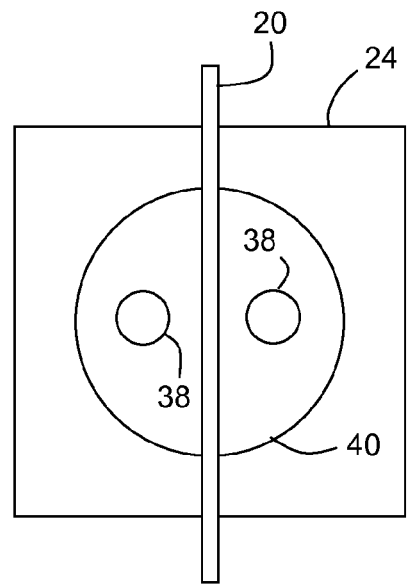
FIG. 4 is a front view of the condensing device of FIG. 3 showing an arrangement of condensing elements, one on each side of a glass ribbon.
Figure 5:
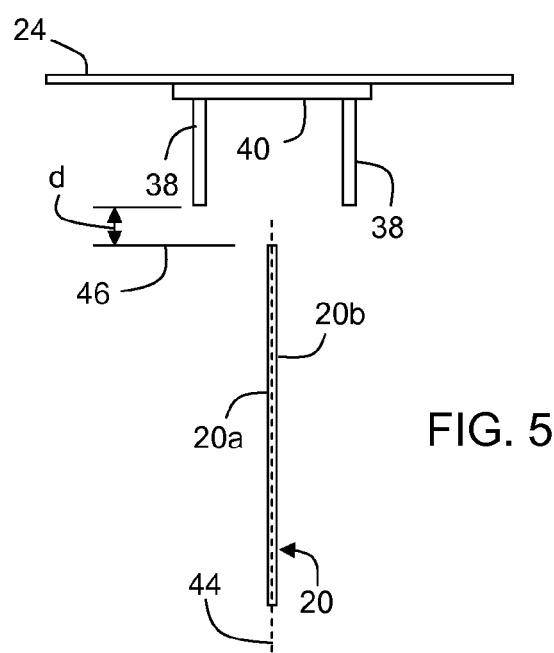
FIG. 5 is a top view of the condensing device of FIG. 3 showing the arrangement of the condensing elements with respect to the glass ribbon.

FIG. 3 illustrates an embodiment of a condensing device 36 comprising a condensing element 38 in the form of an elongate rod or tube projecting outward from a wall (inside surface) of enclosure 24. Although not shown, condensing element 38 may be an actively-cooled component, in which case condensing element 38 may comprise a passage through which a cooling fluid 42 is passed to lower a temperature of the condensing element to a temperature suitable for inducing condensation of the volatilized materials. The cooling fluid 42 may be supplied by a cooling unit (not shown) that circulates and cools the fluid. The cooling unit may employ, for example, heat exchangers and/or refrigeration units. The cooling fluid may be any suitable cooling fluid, such as water or air. Alternatively, condensing element 38 may be passively cooled. In the embodiment depicted in FIG. 3, two condensing elements are shown. Preferably, the two condensing elements are positioned such that, for a first imaginary vertical plane 44 parallel to and passing through root 22, the glass ribbon descending from the forming body root is positioned between the two condenser elements. That is, one condensing element 38 is positioned on one side of the imaginary plane and the other condensing element is positioned on the other side of the imaginary plane (see FIG. 4). Since the imaginary plane approximates the glass ribbon descending from the root, this may be viewed as one condensing element extending outward from the enclosure on one side of the ribbon, and the other condensing element extending from the enclosure on the other side of the ribbon. Preferably, neither condensing element extends far enough into enclosure 24 that the condensing element lies adjacent to the principal surfaces 20a and 20b of the glass ribbon. In other words, a condensing element is positioned to not be immediately adjacent to a principal surface of the ribbon (see FIG. 5). This may be viewed according to the following construct depicted in FIG. 5 showing a downward view of the ribbon as seen from root 22. Assume again first imaginary vertical plane 44 parallel to and passing through root 22. Consider also a second imaginary vertical plane 46 perpendicular to first imaginary vertical plane 44 and intersecting an outermost edge of the ribbon descending from the forming body. In the case of the embodiment of FIG. 3, second vertical plane 46 is generally perpendicular to the elongate condensing elements 38. Preferably, a condensing element does not extend a sufficient distance from enclosure 24 to pass through the second vertical plane. Preferably, a distance "d" from a point on the condensing element farthest from the enclosure wall, a distal end of the condensing element, to the second imaginary vertical plane is at least 5 cm, but may be as great as 30 cm or more. It should be noted that the location of second imaginary vertical plane represents the outermost edge of the ribbon at a particular distance from the root. Because the ribbon attenuates—becomes narrower—as it descends from the root, the location of the outermost edge of the ribbon, and therefore the position of the second imaginary vertical plane, shifts as one looks further down the length of the ribbon from the root. Thus, the distance a given condensing element projects from a wall of the enclosure may vary according to the location of the condensing element relative to root 22. This means condensing elements farther from the root may be longer than condensing elements positioned closer to the root.

Figure 6:
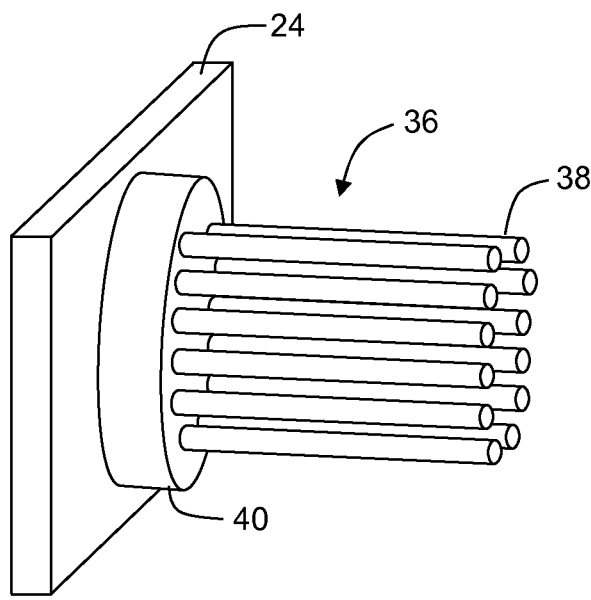
FIG. 6 is a perspective view of a condensing device comprising a plurality of condensing elements.
Figure 7:
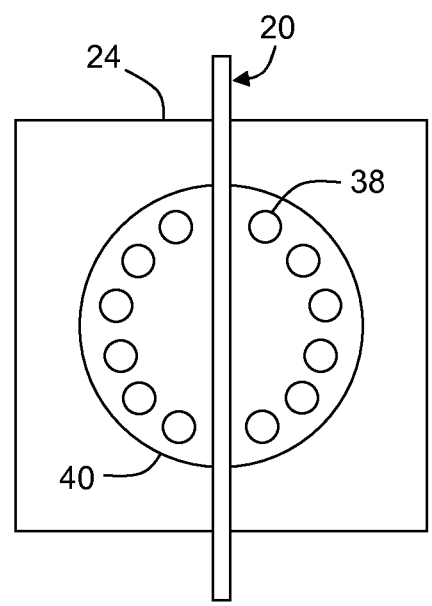
FIG. 7 is a front view of the condensing device of FIG. 6 showing two groups of condensing elements, one group positioned on one side of the glass ribbon and another group on the other side of the glass ribbon, each group of condensing elements comprising a plurality of condensing elements.

FIG. 6 depicts a condensing device 36 similar to the condensing device 36 shown in FIG. 3 with the exception that the condensing device of FIG. 6 comprises a plurality of condensing elements 38. In the embodiment of FIG. 6 a plurality of condensing elements are further positioned on either side of glass ribbon. As with the embodiment of FIG. 3, each condensing element of the condensing device may be supplied with a cooling fluid to reduce a temperature of the condensing element. Preferably, the condensing elements are arranged in groups such that one group of condensing elements is positioned on one side of the glass ribbon and another group of condensing elements is positioned on the other side of the glass ribbon as depicted in FIG. 6. FIG. 7 illustrates the condensing device of FIG. 6 looking straight on toward the condensing elements and depicts the grouping of condensing elements to either side of the glass ribbon.

Figure 8:
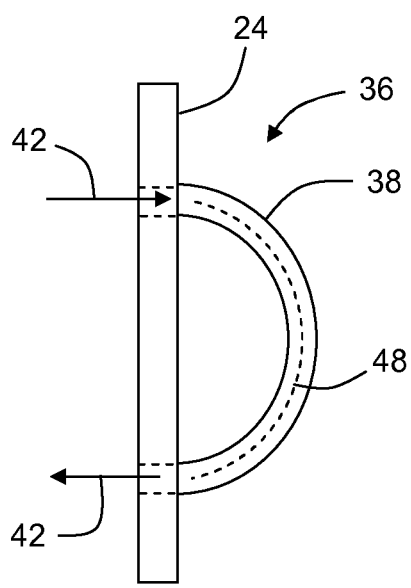
FIG. 8 is a cross sectional side view of a condensing device comprising an arcuate condensing element.

It should be apparent that the condensing elements may be shaped in any suitable shape that maximizes the surface area of the condensing exposed to the atmosphere within enclosure 24. For example, the embodiment of FIG. 8 depicts an arcuate or bow-shaped condensing element 38. That is, the condensing element is a tube having a central axis 48, and the central axis is curved. A condensing element may have a surface area equal to or greater than about 100 cm$^2$, or equal to or greater than 225 cm$^2$. In some embodiments the surface area of a condensing element may be equal to or greater than about 480 cm$^2$.

Figure 9:
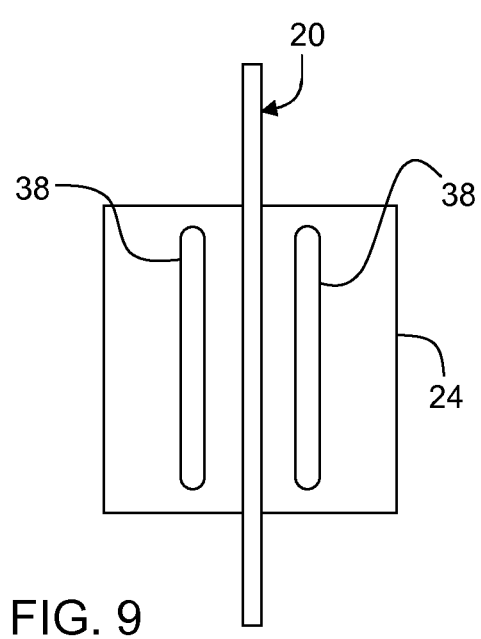
FIG. 9 is a front view of a condensing device similar to the condensing element of FIG. 8 comprising an arcuate condensing element on one side of a glass ribbon and another arcuate condensing element on the other side of the glass ribbon.

Similar to FIG. 7, FIG. 9 is a front view of the condensing device of FIG. 8 illustrating how one arcuate condensing element may be positioned on one side of the glass ribbon and another condensing element positioned on the opposite side of the glass ribbon. Of course, condensing element 38 may be a coiled element. As before, the condensing element may be cooled by a suitable cooling fluid, or it may be solid and passive. If a cooling fluid is used, the cooling fluid may be flowed within an interior of the condensing element, or flowed through a separate cooling element positioned on or around an exterior of the condensing element.

Figure 10:
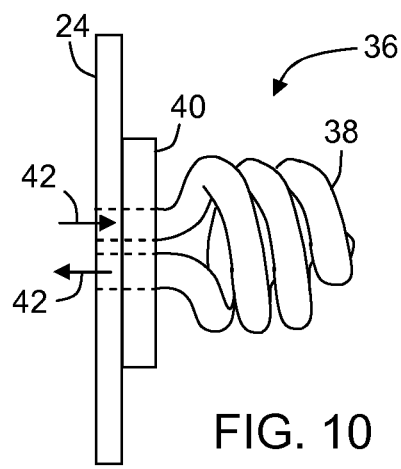
FIG. 10 is a side view of another embodiment of a condensing device comprising a coiled condensing element.

FIG. 10 depicts still another embodiment where condensing element 38 resembles a compact fluorescent light bulb in that the condenser element is a helically wound or twisted tube-shaped element, and, as in the preceding embodiments, may be actively cooled by flowing a cooling fluid through a cooling passage positioned external to the condensing element, or the twisted element may be passively cooled. In some embodiments passive cooling can be implemented by increasing a surface area of regions of a condensing element outside the enclosure and exposed to ambient temperatures. An increasing surface areas can be accomplished by fitting a condensing element with fins or other surface-area increasing projection (not shown). In some embodiments, as in the previous examples, a plurality of twisted condenser elements may be arranged such that a first group of one or more condenser elements are positioned on one side of the glass ribbon and another group of one or more condenser elements are positioned on the other side of the ribbon.

Figure 11:
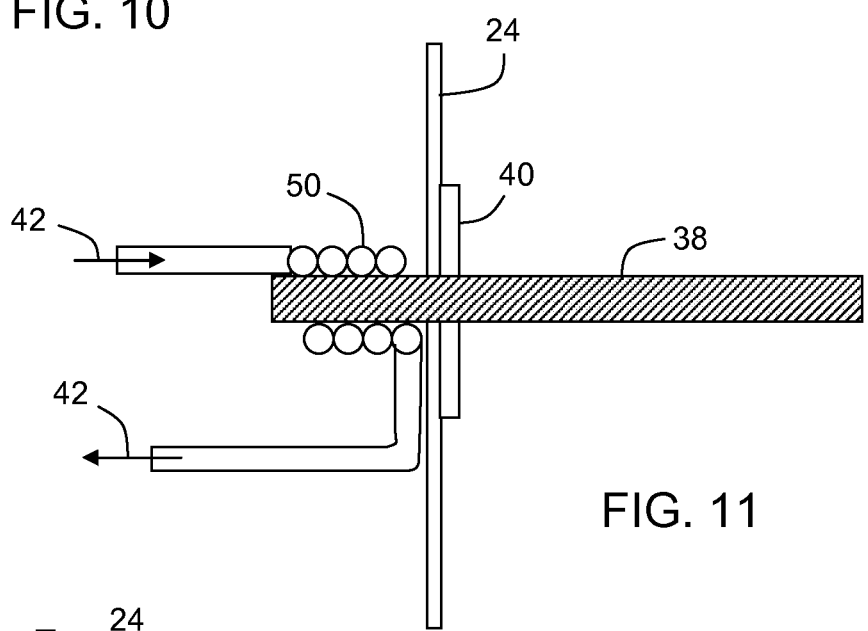
FIG. 11 is a cross sectional side view of a condensing device comprising a solid condensing element with an external cooling member positioned around a portion of the condensing element.

FIG. 11 depicts an embodiment of a condensing device 36 comprising an elongate condensing element 38, where a portion of the elongate condensing element extends outside enclosure 24, and where the portion of the condensing element extending outside enclosure 24 includes cooling coils 50 or other similar cooling passages proximate or in contact with the outside portion of the condensing element. This embodiment relies on conduction through the body of the condensing element for cooling, but is an active cooling approach that eliminates the potential for cooling fluid leaks within the interior of the enclosure.

Figure 12:
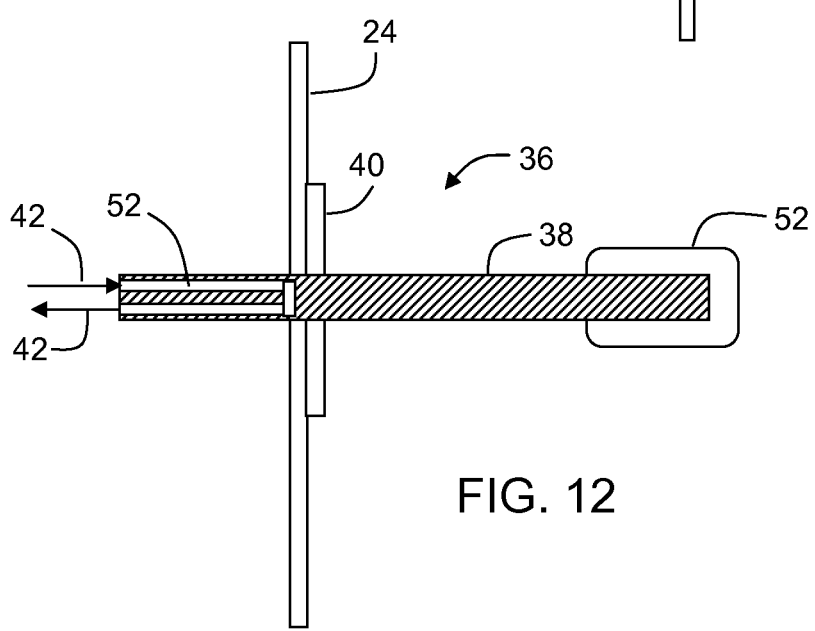
FIG. 12 is a cross sectional view of a condensing element comprising an internal cooling passage for receiving a flow of cooling fluid.

Like FIG. 11, FIG. 12 depicts an embodiment where the active cooling is applied to a portion of the condensing element extending outside the enclosure, and includes a cooling passage 52 inside the condensing element for receiving a flow of cooling fluid. The cooling passage may be restricted only to the outside portion of the condensing element (that portion of the condensing element extending outside enclosure 24, or may extend farther within the condensing element such that the cooling passage occupies a portion of the condensing element within the interior of enclosure 24.

In some embodiments, an insulating material may be positioned on selected portions of a condensing element so that the thermal environment within the enclosure can be more finely controlled, thereby minimizing the impact of the glass ribbon by reducing cooling from certain regions of the condensing element. An example of such insulating is shown in FIG. 12, where an insulating layer or cap is shown fitted to a condensing element. It should be understood that insulating portions of a condensing element can be applied to any of the foregoing condensing element designs, or any other condensing element designs as the need presents itself.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for forming a glass sheet comprising;
an enclosure enclosing an interior volume;
a forming body positioned within the enclosure, the forming body comprising a pair of converging forming surfaces that join along a bottom root of the forming body from which a ribbon of glass is drawn;
a condensing device positioned below the root, the condensing device comprising a first elongate condensing element extending outward from an inside wall surface of the enclosure into the interior volume of the enclosure, the condensing device further comprising a second elongate condensing element extending outward from the inside wall surface of the enclosure into the interior volume of the enclosure, wherein the first elongate condensing element is positioned along a first side of a vertical plane parallel with and passing through the root and the second elongate condensing element is positioned along a second side of the vertical plane; and wherein the condensing device comprises a passage for receiving a flow of a cooling fluid, and wherein neither the first or second elongate condensing element lies adjacent to a principal surface of the glass ribbon.

2. The apparatus according to claim 1, wherein the first elongate condensing element and the second elongate condensing element each comprise a longitudinal axis and each longitudinal axis is curved.

3. The apparatus according to claim 1, wherein the first elongate condensing element and the second elongate condensing element are in the form of a coil.

4. The apparatus according to claim 1, wherein the condensing device comprising a plurality of elongate condensing elements positioned along the first side of the vertical plane and a plurality of elongate condensing elements positioned along the second side of the vertical plane.

5. The apparatus according to claim 1, wherein the first and second condensing elements are configured such that a distance between distal ends of the first and second condensing elements farthest from the inside wall surface of the enclosure and an edge of the ribbon of glass is at least 5 cm.

6. The apparatus according to claim 1, wherein a surface area of the first and/or second condensing element is at least 100 cm$^2$.

7. The apparatus according to claim 1, wherein a surface area of the first and/or second condensing element is at least 480 cm$^2$.

8. The apparatus according to claim 1, wherein the first and/or second condensing element extends at least 12 cm from the inside wall surface of the enclosure.

9. The apparatus according to claim 1, wherein the first and second condensing elements comprise tubes formed without welds.

10. The apparatus according to claim 1, wherein the first and second elongate condensing elements comprise an insulating material positioned thereon.

11. The apparatus according to claim 1, wherein at least a portion of the first and second elongate condensing elements extend outside the enclosure.

* * * * *